(12) United States Patent
Atsuta (10) Patent No.: US 7,457,371 B2
(45) Date of Patent: Nov. 25, 2008

(54) TRANSMISSION SIGNAL GENERATING CIRCUIT AND RADIO BASE STATION COMMUNICATION APPARATUS USING THE SAME

(75) Inventor: Hirosada Atsuta, Tokyo (JP)

(73) Assignee: NEC Corporation (JP)

( * ) Notice: Subject to any disclaimer, the term of this patent is extended or adjusted under 35 U.S.C. 154(b) by 574 days.

(21) Appl. No.: 11/137,384

(22) Filed: May 26, 2005

(65) Prior Publication Data

US 2005/0265292 A1   Dec. 1, 2005

(30) Foreign Application Priority Data

Jun. 1, 2004   (JP) .............................. 2004/163063

(51) Int. Cl.
*H04L 27/00* (2006.01)
(52) U.S. Cl. ..................... 375/295; 375/141; 375/297; 375/150; 375/300; 455/522; 455/450; 455/452.1; 455/452.2
(58) Field of Classification Search ................. 375/141, 375/297, 150, 300, 295; 455/522, 126, 450, 455/452.1, 452.2
See application file for complete search history.

(56) References Cited

U.S. PATENT DOCUMENTS

| 5,634,195 A | * | 5/1997 | Sawyer ........................ 455/522 |
| 5,708,681 A | * | 1/1998 | Malkemes et al. ........... 375/297 |
| 5,712,869 A | * | 1/1998 | Lee et al. ..................... 375/141 |
| 5,715,526 A | * | 2/1998 | Weaver et al. ................ 455/126 |
| 6,041,082 A | * | 3/2000 | Takeda et al. ................ 375/300 |

FOREIGN PATENT DOCUMENTS

| EP | 0 887 947 A2 | 12/1998 |
| EP | 1 011 207 A2 | 6/2000 |
| EP | 1 071 226 A1 | 1/2001 |
| JP | 2002-190774 | 7/2002 |

OTHER PUBLICATIONS

European Search Report issued Sep. 19, 2005.

* cited by examiner

*Primary Examiner*—Sudhanshu C Pathak
(74) *Attorney, Agent, or Firm*—Dickstein, Shapiro, LLP.

(57) ABSTRACT

A transmission signal generating circuit in a radio base station that employs spread processing circuits in order to output spread transmission signals. The signal generating circuit further contains power class selecting circuits, which categorize spread transmission signals into power classes, a first adding circuit, which combines these signals, multipliers, which adjust transmission power of these signals for respective power classes, and a second adding circuit, which combines these signals. The circuit measures and quantinizes the total transmission power to output a power level. A power limitation control memory outputs a multiplication coefficient representing the power class for which transmission power control. Selectors in the circuit select when this control is permitted for a given power class and output this information to the multiplier corresponding to the class. When this control is inhibited for the class, a multiplication coefficient is formed from a predetermined value, and output to the corresponding multiplier.

10 Claims, 9 Drawing Sheets

TRANSMISSION SIGNAL GENERATING CIRCUIT AND RADIO BASE STATION COMMUNICATION APPARATUS USING THE SAME

BACKGROUND OF THE INVENTION

The present invention relates to a CDMA (Code Division Multiple Access) radio communication technique and, more specifically, a transmission power limiting technique of limiting the transmission power of a radio wave transmitted from a radio base station apparatus to a terminal to an allowable average power or less, i.e., a transmission signal generating circuit and a radio base station communication apparatus using the circuit.

In a mobile communication system such as a cellular phone system, a radio base station communication apparatus uses a CDMA spread spectrum technique of performing radio communication between a base station and a terminal by using an information signal obtained by time-division multiplexing of signals spread by orthogonal codes.

In such a CDMA scheme, in order to suppress waveform distortion in a transmission power amplifier within a tolerance limit, the transmission power must be limited to prevent a radio wave from being transmitted from a radio base station communication apparatus to a terminal with a total transmission power exceeding a predetermined allowable average power.

Figure 10:
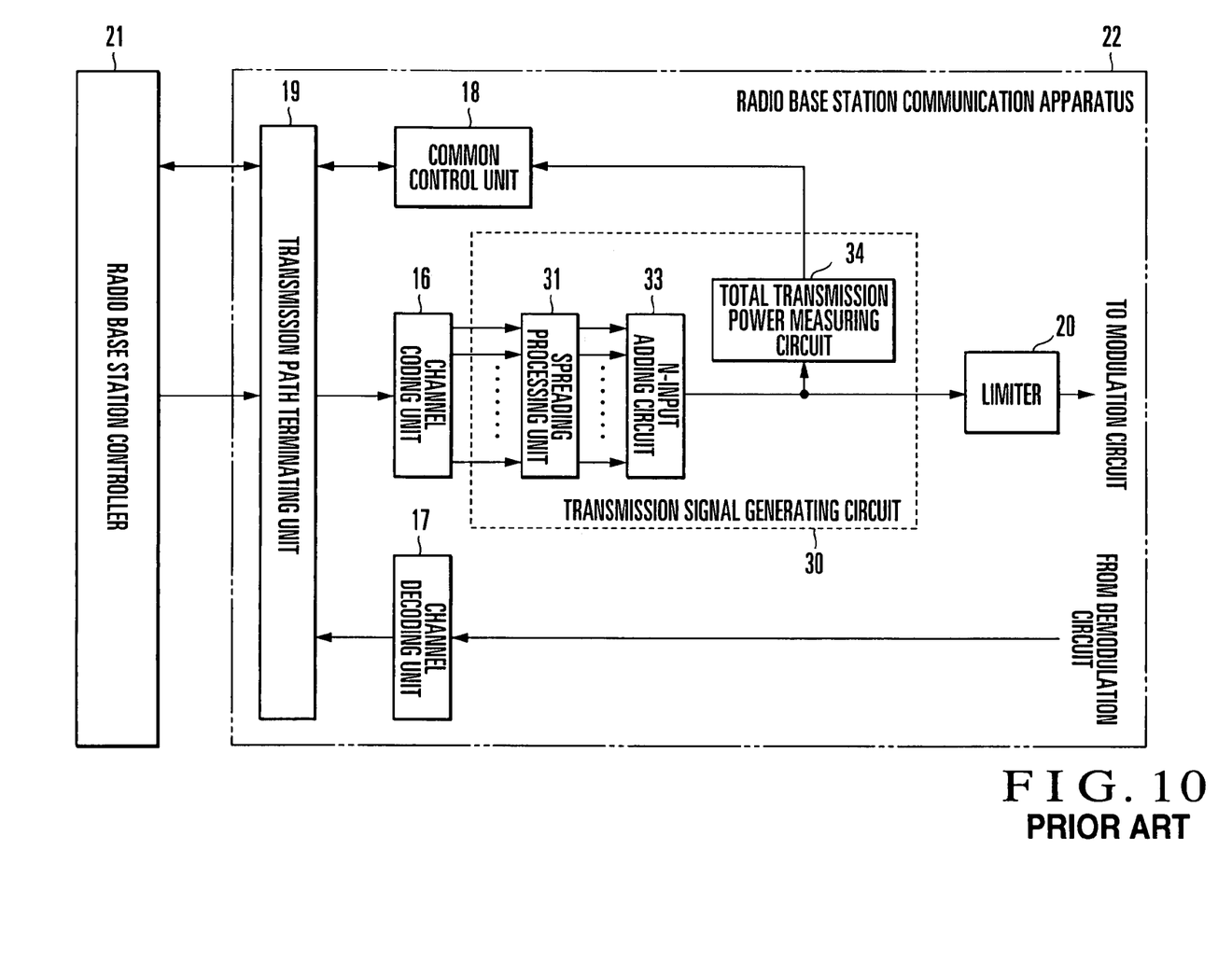
FIG. 10 is a block diagram showing the arrangement of a conventional radio base station communication apparatus.

A conventional transmission power limiting scheme will be described next with reference to FIG. 10. FIG. 10 shows the arrangement of a conventional CDMA radio base station communication apparatus. A CDMA radio base station communication apparatus 22 is wire-connected to a radio base station controller 21 to exchange communication data and control data with the radio base station controller 21.

Downlink processing of transmitting data from the radio base station communication apparatus 22 to a terminal will be described first. A transmission information signal input from the radio base station controller 21 is sent to a channel coding unit 16 through a transmission path terminating unit 19 to be converted into N-channel (N is an integer equal to or more than 2) transmission data to be transmitted as a CDMA signal. The data are then transferred to a transmission signal generating circuit 30.

In the transmission signal generating circuit 30, the transmission data from the channel coding unit 16 are spread by a spreading processing unit 31 using a predetermined spreading code, and the transmission power is adjusted on the basis of power information designated by the radio base station controller 21, thereby generating desired spread transmission signals.

All these N-channel spread transmission signals are added/combined by an N-input adding circuit 33. The resultant signal is output as a transmission output to a modulation circuit through a limiter 20. In this case, a total transmission power measuring circuit 34 is provided to measure the total average transmission power of the output from the N-input adding circuit 33. The measured total average transmission power information is sent to a common control unit 18 and is transmitted to the radio base station controller 21 through the transmission path terminating unit 19.

In uplink processing of transmitting data from a terminal to the radio base station communication apparatus 22, a channel decoding unit 17 performs despreading, RAKE combining, channel decoding, and the like of a reception signal from the demodulation circuit, and the obtained demodulated data is sent to the radio base station controller 21 through the transmission path terminating unit 19.

In this arrangement, the total average transmission power value obtained from the output from the N-input adding circuit 33 is always informed to the radio base station controller 21. If this value exceeds a preset allowable average power, the radio base station controller 21 limits transmission power to prevent the power value from exceeding the allowable average power by reducing the power information of transmission data to the radio base station communication apparatus 22.

In such a conventional technique, however, since the delay time is long in a control loop, high-speed control cannot be done. Although the limiter 20 limits the amplitude value of a transmission output when it exceeds an allowable average power, the aim of this operation is to limit instantaneous power but is not to limit average power.

As described above, therefore, in the conventional transmission power limiting scheme, the first problem is that since the powers of all the transmission channels are uniformly controlled in accordance with a total transmission power value, even the transmission power of a transmission channel which is preferably kept constant is controlled in the same manner as the remaining transmission channels.

The second problem is that since the power of a transmission channel is controlled by the radio base station controller 21 instead of the radio base station communication apparatus 22 itself, the control speed in transmission power limiting operation is low, and a quick change in power cannot be promptly limited.

Conventionally, there have been proposed techniques of categorizing transmission channels into a plurality of power classes and limiting the transmission powers of radio waves transmitted from a radio base station apparatus by controlling transmission powers on a power class basis (see, for example, Japanese Patent Laid-Open No. 2002-190774). According to this technique, a compression ratio is obtained for each power class, and the transmission power of each channel belonging to the corresponding power class is individually controlled. However, there has not been disclosed any specific circuit arrangement associated with transmission power limitation. If, therefore, the above technique is applied to a known radio base station communication apparatus, control is required through the radio base station communication apparatus, posing a problem similar to the second problem. In addition, since transmission power control needs to be performed for each transmission channel, control for transmission power limitation is complicated.

SUMMARY OF THE INVENTION

It is, therefore, a principal object of the present invention to provide a transmission signal generating circuit and radio base station communication apparatus which have a specific arrangement which can quickly limit overall transmission power while maintaining the transmission power of a specific transmission channel.

In order to achieve the above object, according to the present invention, there is provided a transmission signal generating circuit used in a radio base station communication apparatus which transmits data to an arbitrary terminal by a CDMA scheme using a plurality of transmission channels, comprising spreading processing circuits which are provided for the respective transmission channels, spread transmission data on the transmission channels, and output the signals as spread transmission signals, power class selecting circuits which are provided for the respective transmission channels and categorize the spread transmission signals from the spreading processing circuits into a plurality of power classes each serving as a unit of control in transmission power control, first adding circuits which are provided for the respective power classes and add/combine the spread transmission signals categorized by the power class selecting circuits for the respective power classes, multipliers which are provided for the respective power classes and adjust transmission powers of the spread transmission signals from the first adding circuits for the respective power classes by multiplying the spread transmission signals by predetermined multiplication coefficients, a second adding circuit which adds/combines the spread transmission signals from the multipliers to output a spread transmission signal obtained by combining the spread transmission signals on the respective transmission channels, total transmission power measuring means for measuring a total transmission power of each transmission channel on the basis of the spread transmission signal from the second adding circuit, nonlinear quantization means for nonlinearly quantizing the total transmission power obtained by the total transmission power measuring means and outputting a power level corresponding to the total transmission power, a power limitation control memory which outputs a multiplication coefficient indicating a power attenuation amount for a power class for which transmission power control is permitted, on the basis of the power level from the nonlinear quantization means, and selectors which are provided for the respective power classes, select, when transmission power control is permitted for the power class, a multiplication coefficient from the power limitation control memory and output the multiplication coefficient to the multiplier corresponding to the power class, and select, when transmission power control is inhibited for the power class, a multiplication coefficient formed from a predetermined fixed value, and output the multiplication coefficient to the multiplier corresponding the power class.

DESCRIPTION OF THE PREFERRED EMBODIMENTS

The embodiments of the present invention will be described next with reference to the accompanying drawings.

First Embodiment

Figure 1:
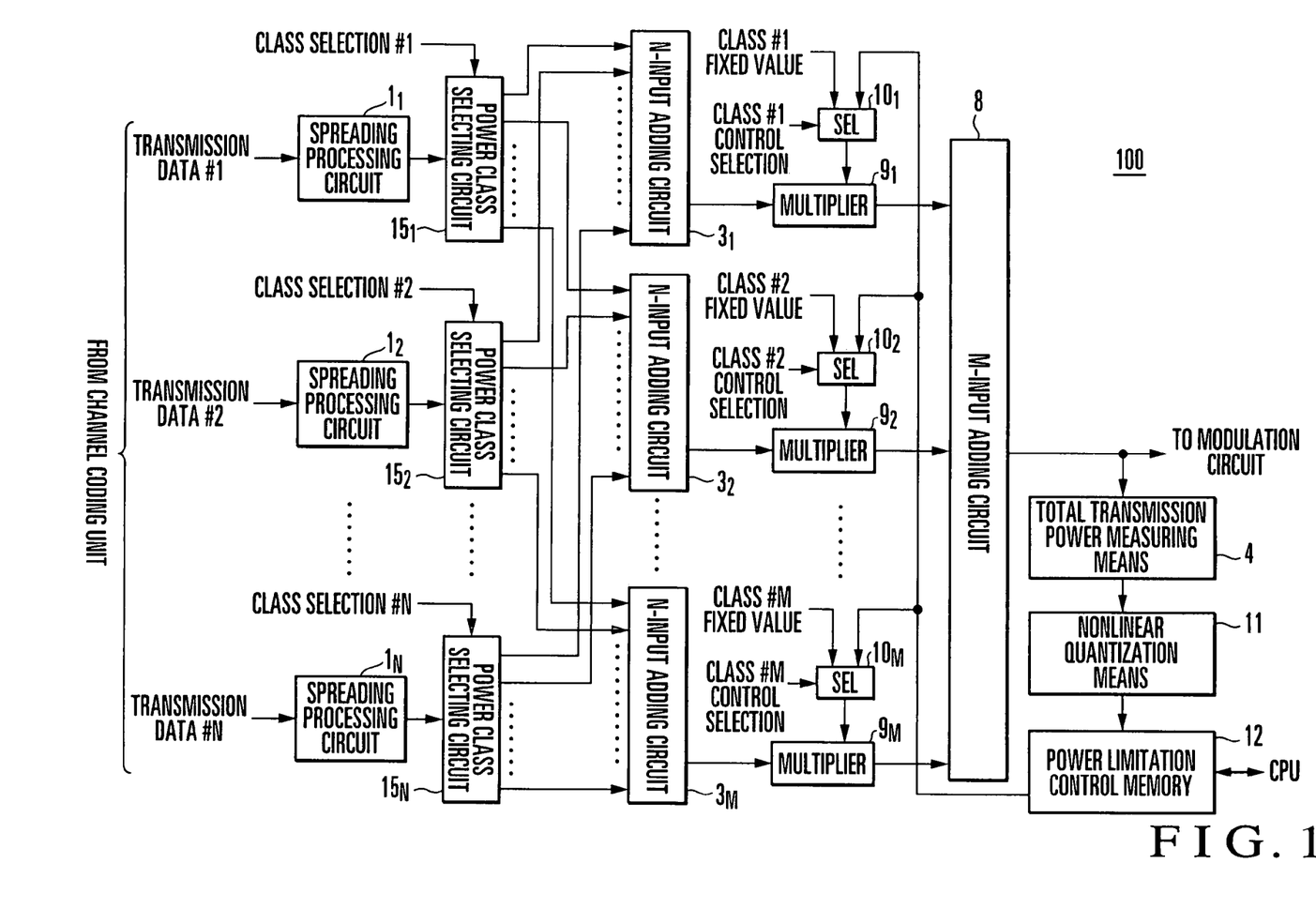
FIG. 1 is a block diagram showing the arrangement (transmission signal generating circuit) of a radio base station communication apparatus according to the first embodiment of the present invention.

A CDMA radio base station communication apparatus according to the first embodiment of the present invention will be described first with reference to FIG. 1. FIG. 1 shows the arrangement of a radio base station communication apparatus according to the first embodiment of the present invention, and more specifically, a portion associated with a transmission signal generating circuit 100. Note that the arrangement of the radio base station communication apparatus is the same as that of a general CDMA radio base station communication apparatus except for the transmission signal generating circuit 100, and hence a detailed description of the identical part will be omitted.

The transmission signal generating circuit 100 includes spreading processing circuits 1 ($1_1$ to $1_N$) (N is an integer equal to or more than 2) and power class selecting circuits 15 ($15_1$ to $15_N$) which are respectively provided for a plurality of transmission channels #1 to #N. In addition, the transmission signal generating circuit 100 includes N-input adding circuits 3 ($3_1$ to $3_M$) (M is an integer equal to or more than 2), multipliers 9 ($9_1$ to $9_M$), and selectors (SELs) 10 ($10_1$ to $10_M$) which are respectively provided for the power classes. The transmission signal generating circuit 100 also includes an M-input adding circuit 8, total transmission power measuring means 4, nonlinear quantization means 11, and power limitation control memory 12.

Note that a power class is a unit of control for the control of each transmission channel provided for the radio base station communication apparatus. Each power class is comprised of one or more arbitrary transmission channels. The transmission powers of transmission channels belonging to a given power class are controlled at the same ratio on the basis of a multiplication coefficient corresponding to the power class.

The spreading processing circuit 1 is a circuit unit which spreads transmission data input from a channel coding unit (not shown) by using a predetermined spreading code. The power class selecting circuit 15 is a circuit unit which outputs a spread transmission signal from the spreading processing circuit 1 to the N-input adding circuit 3 corresponding to a predetermined power class upon categorizing the signal on the basis of a class selection signal.

The N-input adding circuit (first adding circuit) 3 is a circuit unit which adds/combines spread transmission signals from the respective power class selecting circuits 15 and outputs the resultant signal. The multiplier 9 is a circuit unit which multiplies the spread transmission signal from the N-input adding circuit 3 by the multiplication coefficient output from the selector 10.

The M-input adding circuit (second adding circuit) 8 is a circuit unit which adds/combines spread transmission signals from the respective multipliers 9 and outputs the resultant signal to a modulation circuit (not shown). The total transmission power measuring means 4 is a circuit unit which measures the total transmission power of a spread transmission signal from the M-input adding circuit 8 and outputs the resultant average power value. The nonlinear quantization means 11 is a circuit unit which nonlinearly quantizes an average power value from the total transmission power measuring means 4 to categorize it into several power levels.

The power limitation control memory 12 is a memory circuit which comprises a rewritable memory such as a RAM. This memory receives a power level from the nonlinear quantization means 11 as address information, and reads out a power attenuation amount corresponding to the power level as a multiplication coefficient by looking up a table written in advance by a CPU (not shown). The memory then outputs the value to each selector 10. The selector 10 is a circuit unit which selects a multiplication coefficient from the power limitation control memory 12 or a multiplication coefficient formed from a class fixed value in accordance with a class control selection signal indicating the permission/inhibition of transmission power control with respect to the corresponding power class, and outputs the selected coefficient to the multiplier 9.

Operation of First Embodiment

The operation of the radio base station communication apparatus according to the first embodiment of the present invention will be described next with reference to FIG. 1.

Output signals from the spreading processing circuits $1_1$ to $1_N$ which respectively spread N-channel transmission data are sent out to only the N-input adding circuits $3_1$ to $3_M$ corresponding to power classes selected from the M power classes defined in advance which are selected by the power class selecting circuits $15_1$ to $15_N$ using the respective class selection signals, and are added/combined for each power class.

The multipliers $9_1$ to $9_m$ functioning as power attenuators for the respective power classes multiply spread transmission signals added/combined for the respective power classes by multiplication coefficients. The M-input adding circuit 8 then adds the products for all the classes. The resultant data is sent out to a modulation circuit on the subsequent stage.

The total transmission power measuring means 4 calculates the average power value of all class added/combined signal output from the M-input adding circuit 8. The nonlinear quantization means 11 categorizes the power value into some power levels. The power limitation control memory 12 then generates a multiplication coefficient which determines a control power attenuation amount of transmission power in accordance with a power value ΔP by which a total signal power value P exceeds an allowable average power Pmax, and outputs the multiplication coefficient to each of the selectors $10_1$ to $10_M$ for the respective power classes.

When class control selection signals indicate the permission of transmission power control for the respective power classes, the selectors $10_1$ to $10_M$ for the respective power classes select multiplication coefficients from the power limitation control memory 12, and output them to the multipliers $9_1$ to $9_M$. With this operation, spread transmission signals belonging to the power classes for which transmission power control is permitted are multiplied by the multiplication coefficients, thereby reducing the transmission powers.

If class control selection signals indicate transmission power control inhibition for the respective power classes, the selectors select preset fixed values instead of multiplication coefficients from the power limitation control memory 12, and output the selected values to the multipliers $9_1$ to $9_M$. With this operation, since spread transmission signals belonging to the power classes for which transmission power control is inhibited are multiplied by the fixed values, the corresponding transmission powers are maintained.

With the above circuit arrangement, transmission powers can be controlled for the respective power classes. If, therefore, the total transmission power value P exceeds the preset allowable average power Pmax, only the transmission power of a specific signal component belonging to the power class for which transmission power control is permitted can be controlled to limit the total transmission power to the allowable average value without changing the powers of other signal components.

In this case, a control power attenuation amount ΔP with respect to the total transmission power value is obtained by PA-PB where PA is the power value obtained by subtracting a total fixed power value P1, which is the sum of the power values corresponding to power classes for which no transmission power control is performed, from a total transmission power value P, and PB is the power value obtained by subtracting the total fixed power value P1 from a set allowable average power value Pmax. The power limitation control memory 12 then generates a multiplication coefficient corresponding to the ratio PB/PA. This makes it possible to reduce a control error in power limitation and always transmit radio waves to a terminal by using the maximum transmission power allowed for the radio base station communication apparatus.

Figure 2:
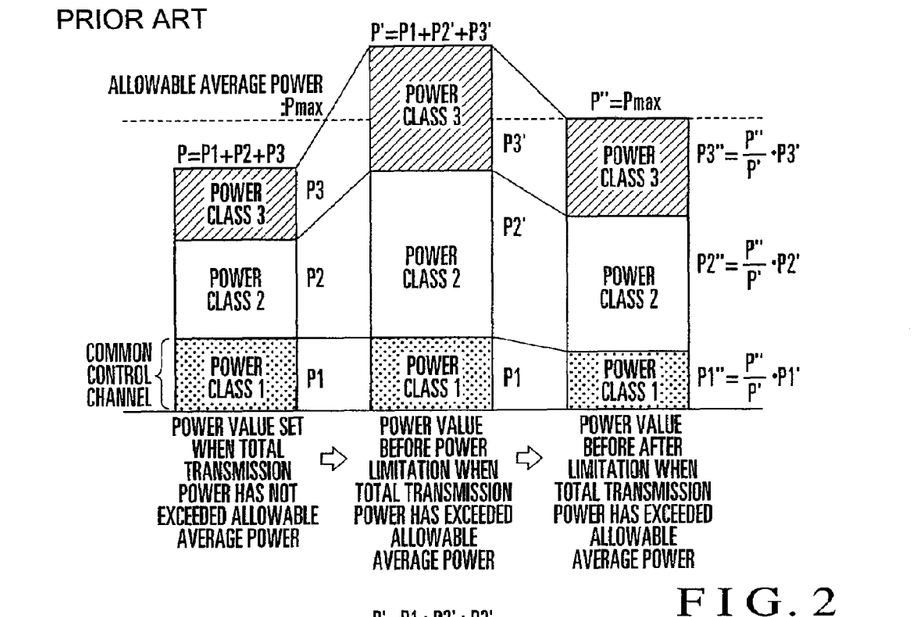
FIG. 2 is a view showing changes in transmission power in a conventional transmission power limiting scheme.
Figure 3:
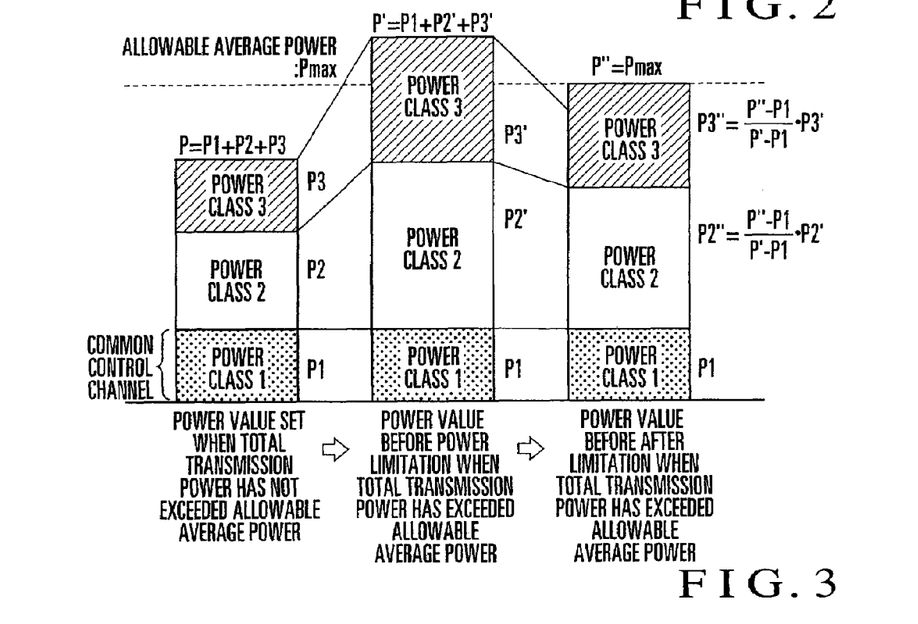
FIG. 3 is a view showing changes in transmission power in a transmission power limiting scheme according to the first embodiment of the present invention.

An example of the operation of the radio base station communication apparatus according to this embodiment will be described with reference to FIGS. 2 and 3. FIG. 2 shows changes in transmission power according to the conventional transmission power limiting scheme. FIG. 3 shows changes in transmission power according to the transmission power limiting scheme of this embodiment.

In the conventional transmission power limiting scheme, transmission channels are not categorized into power classes to discriminate them with power control methods. For the sake of descriptive convenience, however, it is assumed that transmission channels are also handled for the respective power classes in the conventional scheme.

Assume that transmission channels categorized into three (M=3) power classes as initial transmission outputs are transmitted with the power values shown in FIG. 2. At this time, a total average transmission power value P (=P1+P2+P3) as the sum total of the three power classes is smaller than a preset allowable average power value Pmax. In this case, power class #1 is a control channel common to all terminals, and it is preferable that signals be always transmitted through this channel with a constant transmission power. Other power classes #2 and #3 are communication channels (individual channels) individually assigned to the respective terminals.

Assume next that as power classes #2 and #3 which are powers associated with individual channels increase due to, for example, an increase in the number of terminals connected to the base station, the total average transmission power value P exceeds the allowable average power value Pmax. In this case, according to the conventional transmission power limiting scheme, since the total signal power is controlled, if the total average transmission power value P is suppressed to the allowable average power value Pmax, the power values of all the power classes are uniformly reduced, resulting in a reduction in the power of the control channel.

In contrast to this, according to the transmission power limiting scheme of this embodiment, control operation like that shown in FIG. 3 is performed. Assume that the total average transmission power value P exceeds the allowable average power value Pmax. In this case, even if the total average transmission power value P is suppressed to the allowable average power value Pmax, performing power control for each power class makes it possible to control and reduce only the power values of power classes #2 and #3 without changing the power value of power class #1. The power of the control channel whose power value should not be reduced can be kept constant.

In this case, in the arrangement shown in FIG. 1, a control selection signal for power class #1 has selected the inhibition of power control, i.e., setting for not performing automatic transmission power control by hardware, and causes a multiplication coefficient formed from a preset fixed value to be output to the multiplier $9_1$. In contrast, control selection signals for power classes #2 and #3 select setting for permitting transmission power control, i.e., performing automatic transmission power control by hardware, thereby allowing power control of only power classes #2 and #3 on the basis of the total average transmission power value P measured by the total transmission power measuring means 4.

As described above, in this embodiment, the N-input adding circuits and multipliers are provided for the respective power classes, and the N-input adding circuits add/combine spread transmission signals through the respective transmission channels for the respective power classes. The respective multipliers then perform power control individually with respect to transmission signals for the respective power classes on the basis of the total transmission power of the respective transmission channels. In limiting the total transmission power value from exceeding the allowable average power value, the above operation can control only the powers of transmission channels whose transmission powers can be reduced without reducing the power of a transmission channel whose transmission power is preferably kept constant, e.g., a control channel. Therefore, this eliminates the necessity to perform transmission power control for each transmission channel through a radio base station communication apparatus as in the prior art and can quickly and easily limit the overall transmission power while maintaining the transmission power of a specific transmission channel, thereby preventing a deterioration in the line quality of the overall system.

Second Embodiment

Figure 4:
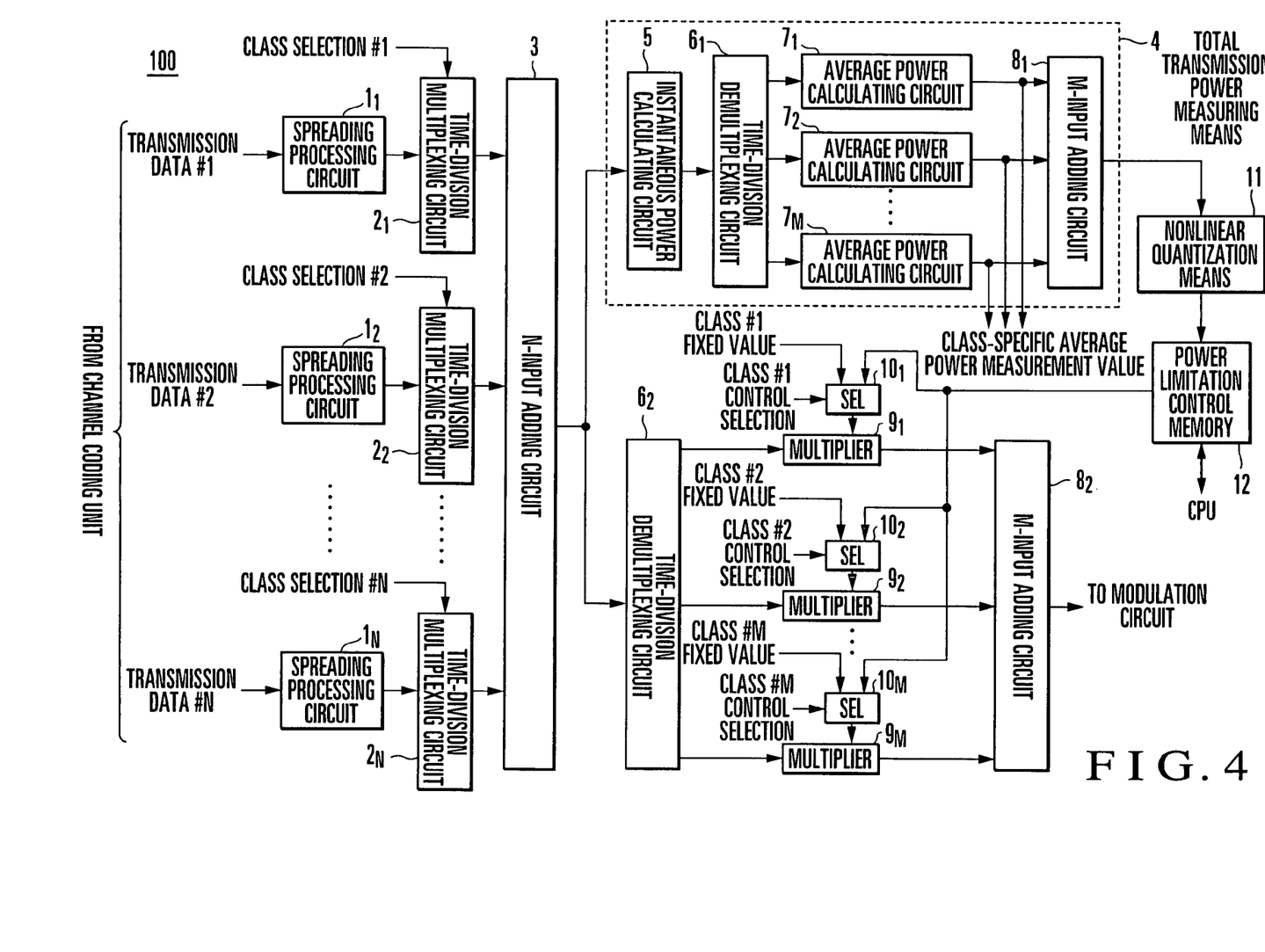
FIG. 4 is a block diagram showing the arrangement (transmission signal generating circuit) of a radio base station communication apparatus according to the second embodiment of the present invention.

A radio base station communication apparatus according to the second embodiment of the present invention will be described next with reference to FIG. 4. FIG. 4 shows the arrangement of a CDMA radio base station communication apparatus according to the second embodiment of the present invention, and more specifically, a portion associated with a transmission signal generating circuit 100.

In this embodiment, as compared with the first embodiment described above, in order to reduce the circuit size, and more specifically, the number of N-input adding circuits, by achieving commonality of processing for each power class, commonality of class-specific adding processing circuits for all power classes is achieved by using a time-division multiplex frame format.

Figure 5:
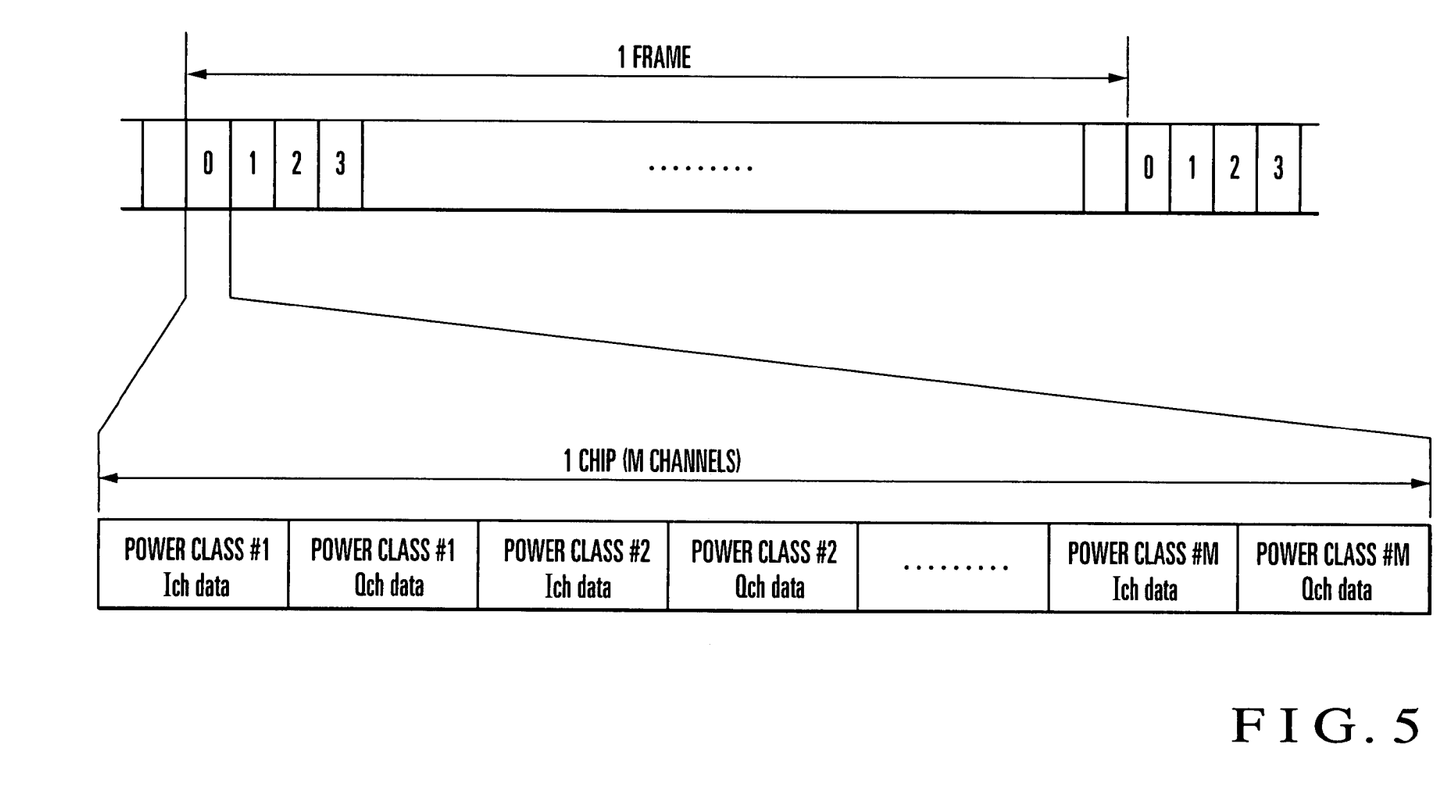
FIG. 5 is a view showing an example of a transmission processing multiplex format used in the radio base station communication apparatus according to the second embodiment of the present invention.

Referring to FIG. 4, transmission data #1 to #N which comprise N-channel symbol data and amplitude data and input from the channel coding unit are subjected to spreading processing in corresponding spreading processing circuits $1_1$ to $1_N$ with spreading codes, thereby generating spread transmission signals. N time-division multiplexing circuits $2_1$ to $2_N$ multiplex and store these N-channel spread transmission signals in time slots corresponding to the power classes selected for the respective channels on a transmission processing multiplex format which are time-divisionally multiplexed for the respective M power classes defined in advance, as shown in FIG. 5. The spread transmission signals multiplexed in the time slots for the respective selected power classes of the N systems are input to an N-input adding circuit 3 to be added/combined for the respective time slots. That is, the N-channel spread transmission signals are added for the respective power classes.

An output signal from the N-input adding circuit 3 is branched into two signals. One signal is sent to a time-division demultiplexing circuit $6_2$ to be demultiplexed for the respective power classes. The resultant signals are input to multipliers $9_1$ to $9_M$ provided for the respective M power classes to be multiplied by the respective multiplication coefficients. In this case, the multipliers $9_1$ to $9_M$ function as power attenuators, and can control power values for the respective power classes. The spread transmission signals for the respective power classes, whose power values have been controlled, are input to an M-input adding circuit $8_2$ in which all the signals belonging to the different owe classes are combined. Finally, a spread transmission output free from categorization according to the power classes is generated and output to a modulation circuit.

The other signal of the two branched output signals from the N-input adding circuit 3 is sent to a total transmission power measuring means 4, which in turn calculates a total average transmission power value. A nonlinear quantization means 11 then categorizes the total average transmission power value into some power level. This power level is input as an address to a power limitation control memory 12. As in the first embodiment, a table of power attenuation amounts to be controlled with respect to transmission power values is written in advance in the power limitation control memory 12 by software from a CPU.

Multiplication coefficient data corresponding to the power attenuation amounts read out from the power limitation control memory 12 are input to the multipliers $9_1$ to $9_M$ provided for the respective power classes through selectors $10_1$ to $10_M$ which select whether or not to perform automatic control of power values by hardware. When not performing automatic control of power values by hardware, the selectors $10_1$ to $10_M$ output predetermined multiplication coefficients set by software to the multipliers $9_1$ to $9_M$, thereby making power attenuation amounts in them constant.

[Total Transmission Power Measuring Means]

Figure 6:
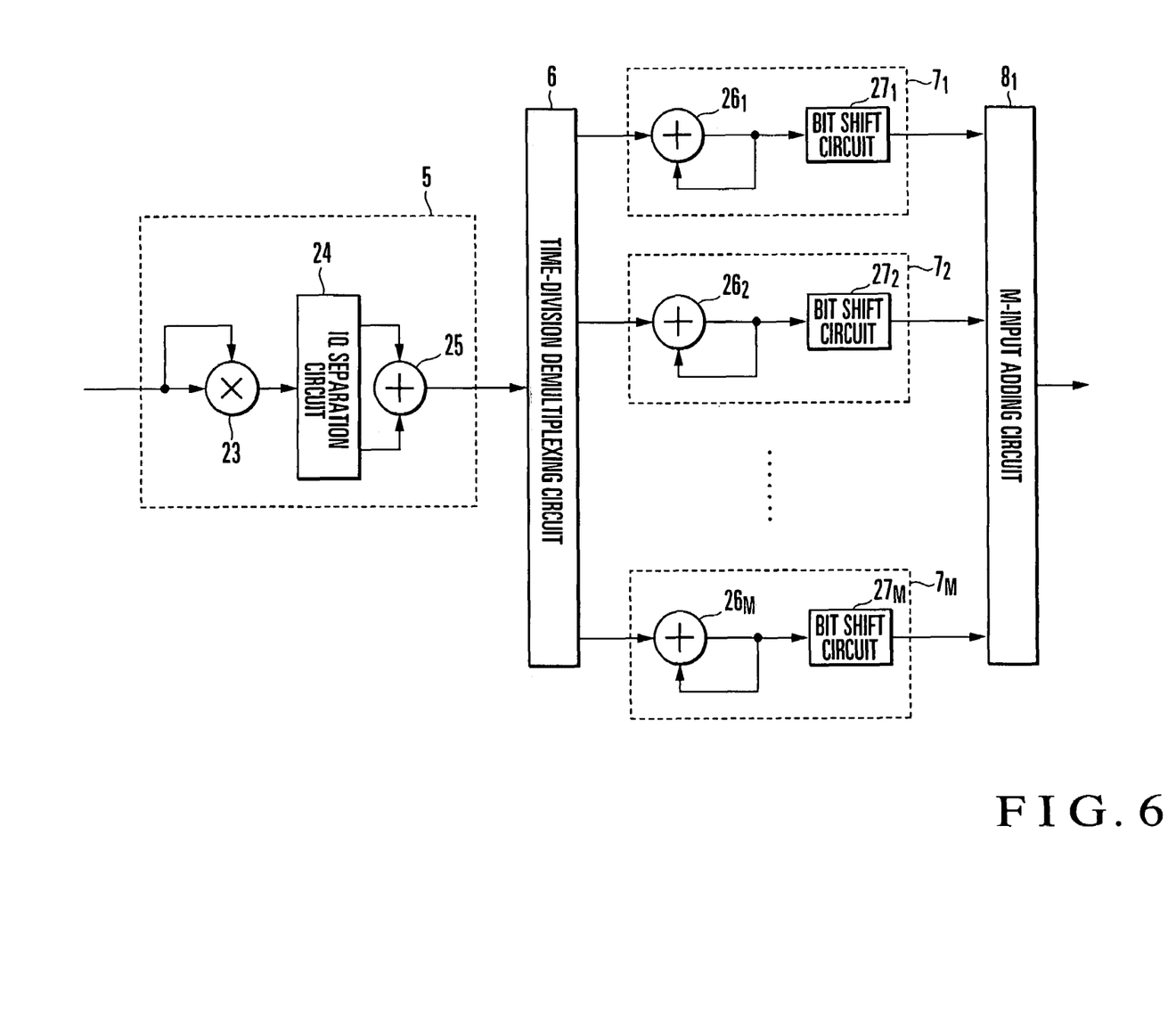
FIG. 6 is a block diagram showing an example of the arrangement of a total transmission power measuring means.

The total transmission power measuring means 4 will be described in detail next with reference to FIG. 6. FIG. 6 shows an example of the arrangement of the total transmission power measuring means 4. A transmission signal in a transmission processing multiplex format like that shown in FIG. 5 is input to the total transmission power measuring means 4. First of all, an instantaneous power calculating circuit 5 calculates an instantaneous power for each bit (to be referred to as a chip) of a spreading rate on a power class basis.

The instantaneous power calculating circuit 5 is comprised of a square computation circuit 23 which obtains the square value of I-channel data and Q-channel data of each power class, an IQ separation circuit 24 which separates a transmission processing multiplex format into $I_2$ data and $Q_2$ data, and an adder 25 which obtains the square sum of the $I_2$ data and $Q_2$ data.

The square sum obtained in this manner is an instantaneous power. A time-division demultiplexing circuit $6_1$ demultiplexes this instantaneous power into instantaneous power signals for the respective power classes. Average power values for the power classes are then calculated by average power calculating circuits $7_1$ to $7_M$ comprising adders $26_1$ to $26_M$ which integrate the instantaneous powers for the respective power classes for a predetermined period of time (a chip count of a power of two), and bit shift circuits $27_1$ to $27_M$ which obtain average values by dividing the integral values, obtained by integration for the chip count of the power of two, by the chip count of the power of two. The average power values for the respective power classes are input to an M-input adding circuit $8_1$, which in turn adds the power values for all the power classes to finally obtain a total transmission power. In some cases, the average power values for the respective power classes are sent to a monitoring control unit to be monitored.

As described above, according to this embodiment, in limiting a total transmission power value from exceeding an allowable average power value, this embodiment can control only the powers of transmission channels whose transmission power can be reduced without reducing the power of a transmission channel whose transmission power should not be reduced, e.g., a control channel. Therefore, this eliminates the necessity to perform transmission power control for each transmission channel through a radio base station communication apparatus as in the prior art and can quickly and easily limit the overall transmission power while maintaining the transmission power of a specific transmission channel, thereby preventing a deterioration in the line quality of the overall system.

In addition, since the time-division demultiplexing circuit $6_2$ is provided to demultiplex a signal from the N-input adding circuit 3 into signals for the respective power classes and distribute the respective signals to the multipliers for the respective power classes, the N-input adding circuits $3_1$ to $3_M$ in FIG. 1, which are provided for the respective power classes, can be integrated into one N-input adding circuit 3 to achieve commonality, thereby reducing the circuit size of the radio base station communication apparatus as compared with the first embodiment.

Third Embodiment

Figure 7:
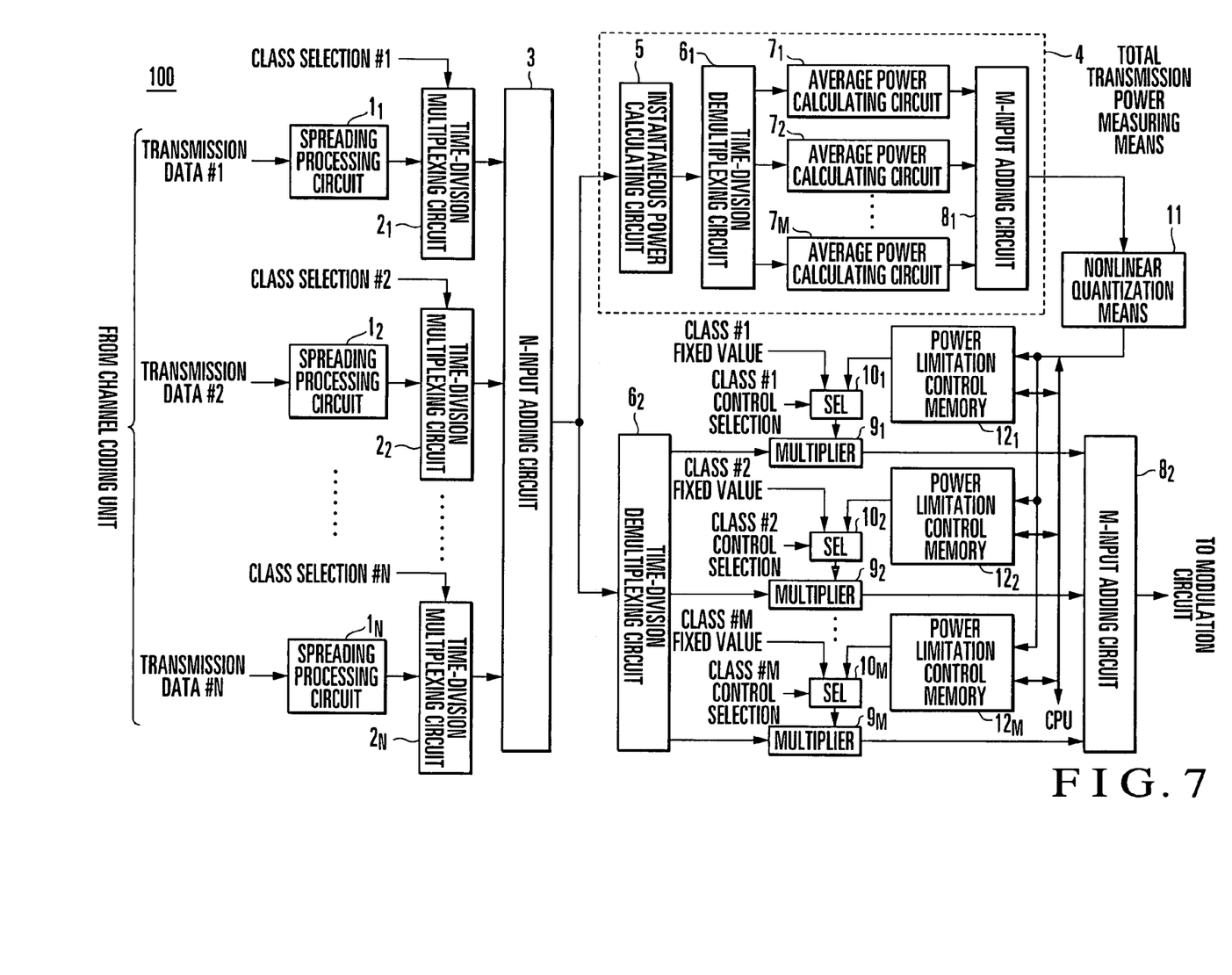
FIG. 7 is a block diagram showing the arrangement (transmission signal generating circuit) of a radio base station communication apparatus according to the third embodiment of the present invention.

A radio base station communication apparatus according to the third embodiment of the present invention will be described next with reference to FIG. 7. FIG. 7 shows the arrangement of a CDMA radio base station communication apparatus according to the third embodiment of the present invention, and more specifically, a portion associated with a transmission signal generating circuit 100.

The above second embodiment (see FIG. 4) has exemplified the case wherein the power limitation control memory 12 common to the respective power classes is used. However, as in the radio base station communication apparatus according to the third embodiment, power limitation control memories $12_1$ to $12_M$ may be provided for the respective power classes.

In this embodiment, as shown in FIG. 7, the power limitation control memories $12_1$ to $12_M$ are provided for the respective power classes between a nonlinear quantization means 11 and selectors $10_1$ to $10_M$ for the respective power classes.

Therefore, arbitrary tables corresponding to the respective power classes can be set for the power limitation control memories $12_1$ to $12_M$, respectively, and multiplication coefficients data corresponding to different power attenuation amounts can be output for the respective power classes. This makes it possible to finely and easily realize transmission power control for the respective power classes.

Fourth Embodiment

Figure 8:
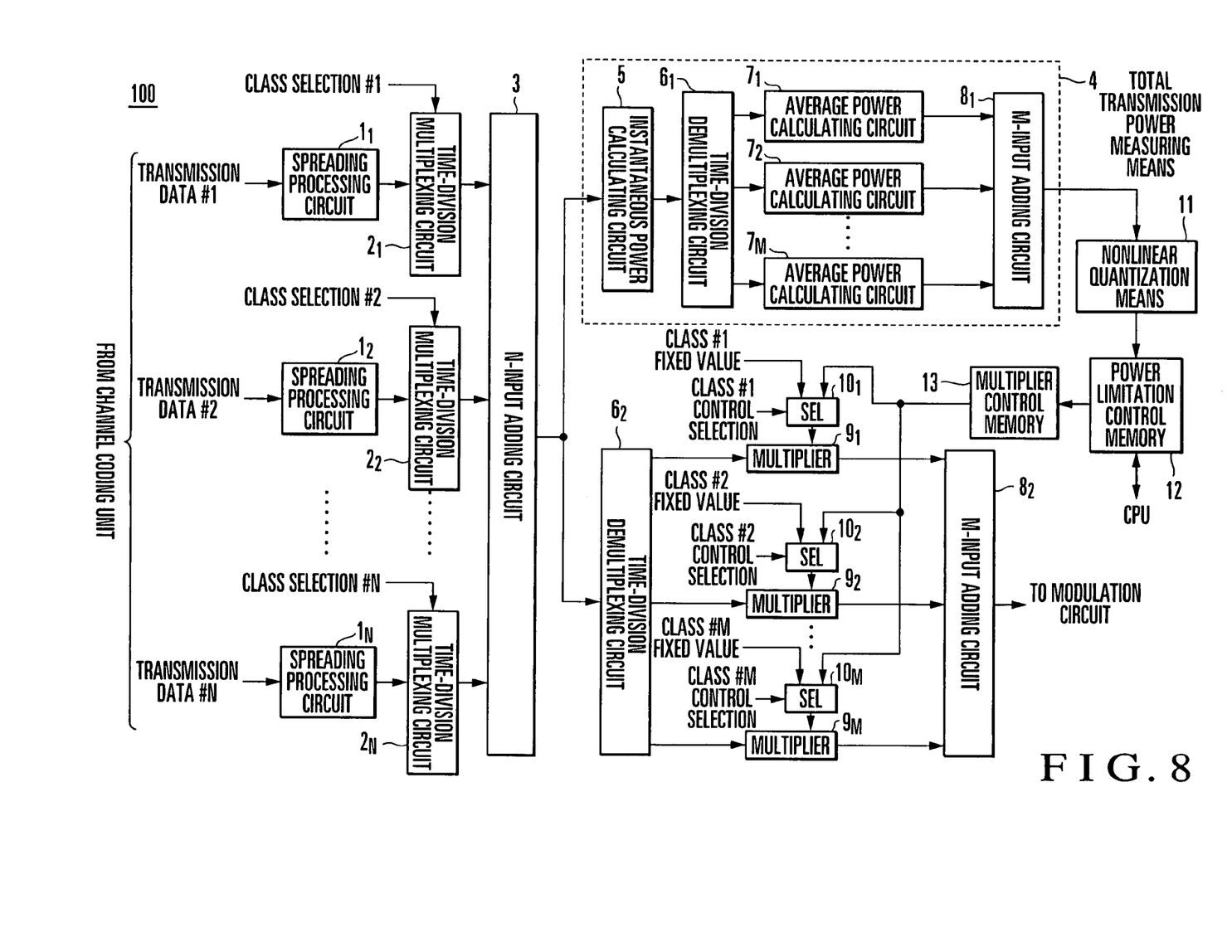
FIG. 8 is a block diagram showing the arrangement (transmission signal generating circuit) of a radio base station communication apparatus according to the fourth embodiment of the present invention.

A radio base station communication apparatus according to the fourth embodiment of the present invention will be described next with reference to FIG. 8. FIG. 8 shows the arrangement of a CDMA radio base station communication apparatus according to the fourth embodiment of the present invention, and more specifically, a portion associated with a transmission signal generating circuit 100.

The above second embodiment (see FIG. 4) has exemplified the case wherein multiplication coefficient data corresponding to power attenuation amounts are output from the power limitation control memory 12 to the selectors $10_1$ to $10_M$. However, as in the radio base station communication apparatus according to the fourth embodiment, multiplication coefficients may be output from a power limitation control memory 12 to selectors $10_1$ to $10_M$ through a multiplier control memory 13.

In this embodiment, as shown in FIG. 8, the multiplier control memory 13 formed from a ROM or RAM is provided between the power limitation control memory 12 and the selectors $10_1$ to $10_M$.

Therefore, making the multiplier control memory 13 perform linear/nonlinear conversion makes it sufficient to prepare only linear data, as multiplication coefficient data corresponding to power attenuation amounts corresponding to power levels from a nonlinear quantization means 11, for tables in power limitation control memories $12_1$ to $12_M$, thereby simplifying the tables. This makes it possible to reduce the work load of creating tables in the power limitation control memories $12_1$ to $12_M$.

Fifth Embodiment

Figure 9:
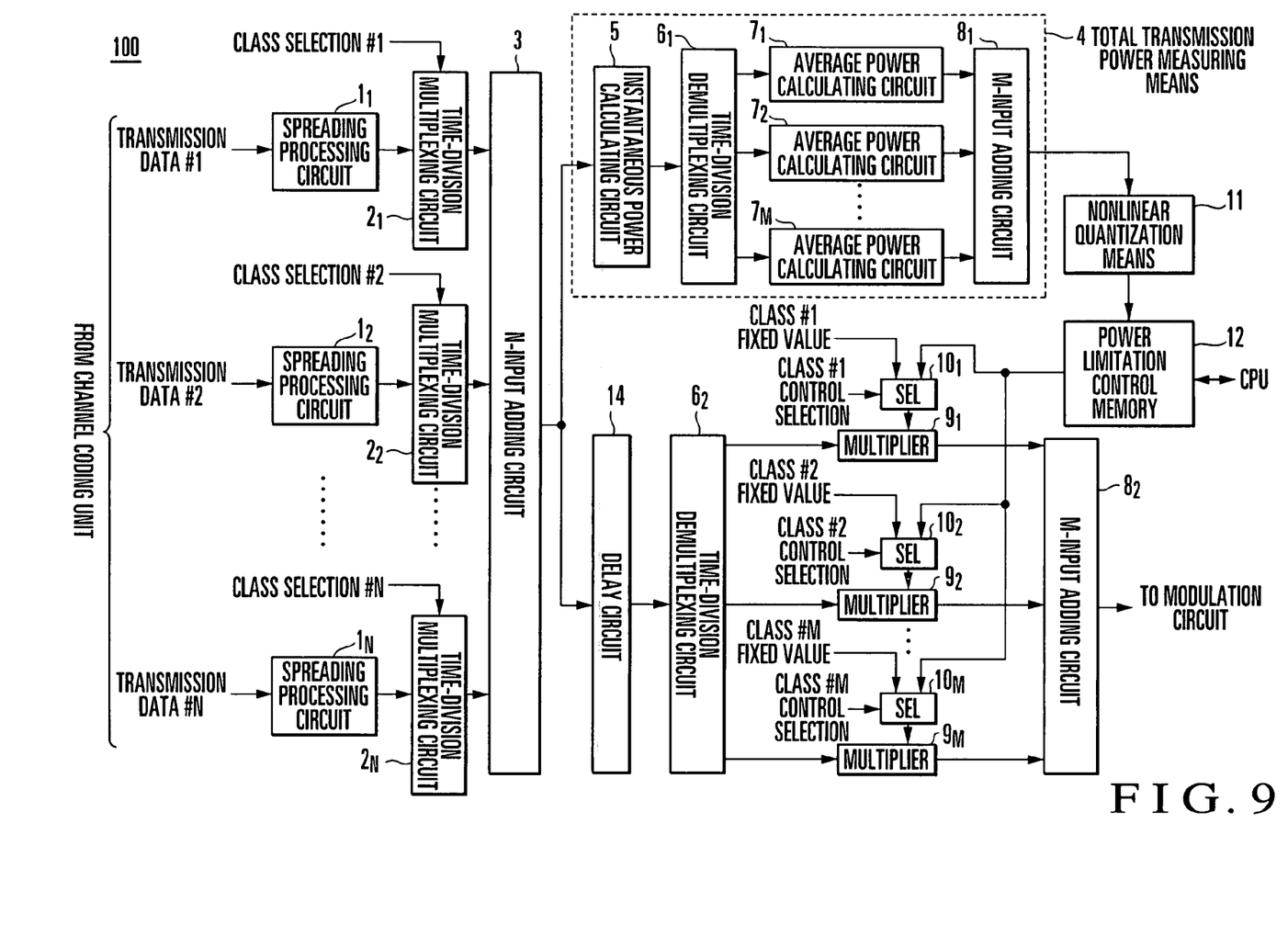
FIG. 9 is a block diagram showing the arrangement (transmission signal generating circuit) of a radio base station communication apparatus according to the fifth embodiment of the present invention.

A radio base station communication apparatus according to the fifth embodiment of the present invention will be described next with reference to FIG. 9. FIG. 9 shows the arrangement of a CDMA radio base station communication apparatus according to the fifth embodiment of the present invention, and more specifically, a portion associated with a transmission signal generating circuit 100.

The above second embodiment (see FIG. 4) has exemplified the case wherein an output from the N-input adding circuit 3 is branched and output to the total transmission power measuring means 4 and the time-division demultiplexing circuit $6_2$ at the same timing. However, as in the radio base station communication apparatus of the fifth embodiment, a delay circuit 14 may be provided to delay the timing of outputting a signal to the time-division demultiplexing circuit $6_2$.

In this embodiment, as shown in FIG. 9, the delay circuit 14 is provided between an N-input adding circuit 3 and a time-division demultiplexing circuit $6_2$.

This arrangement can delay the timing of inputting an output from the N-input adding circuit 3 to the time-division demultiplexing circuit $6_2$ as compared with the total transmission power measuring means 4, thereby allowing the delay circuit 14 to adjust processing delay times in the total transmission power measuring means 4, a nonlinear quantization means 11, and a power limitation control memory 12. As a consequence, when a delay is allowed in terms of an application, even if a processing time delay occurs on the total transmission power measuring means 4 side, transmission signals can be synchronized with the timings of power control in multipliers $9_1$ to $9_M$, thereby realizing more accurate power control.

Of the above embodiments, the third and fourth embodiments have been described on the basis of the second embodiment. However, the present invention is not limited to this, and these embodiments can be applied to the first embodiment to obtain functions and effects similar to those described above.

In addition, in each embodiment, since the multipliers 9 and selectors 10 are provided for the respective power classes, permission/inhibition (necessity) of transmission power control for each power class can be easily changed by using a corresponding class control selection signal. Note that when transmission power control for an arbitrary power class is to be permanently inhibited, the selector and also the selector for the corresponding power class may be omitted.

According to the present invention, spread transmission signals on the respective transmission channels are added/combined for the respective power classes, and power control is performed individually for transmission signals for the respective power classes by using the respective multipliers on the basis of the total transmission powers of the respective transmission channels. Therefore, in limiting a total transmission power value from exceeding an allowable average power value, this embodiment can control only the powers of transmission channels whose transmission power can be reduced without reducing the power of a transmission channel whose transmission power should not be reduced, e.g., a control channel.

Therefore, this eliminates the necessity to perform transmission power control for each transmission channel through a radio base station communication apparatus as in the prior art and can quickly and easily limit the overall transmission power while maintaining the transmission power of a specific transmission channel, thereby preventing a deterioration in the line quality of the overall system.

What is claimed is:

1. A transmission signal generating circuit used in a radio base station communication apparatus which transmits data to an arbitrary terminal by a CDMA scheme using a plurality of transmission channels, comprising:

spreading processing circuits which are provided for the respective transmission channels, spread transmission data on the transmission channels, and output the signals as spread transmission signals;

power class selecting circuits which are provided for the respective transmission channels and categorize the spread transmission signals from said spreading processing circuits into a plurality of power classes each serving as a unit of control in transmission power control;

first adding circuits which are provided for the respective power classes and add/combine the spread transmission signals categorized by said power class selecting circuits for the respective power classes;

multipliers which are provided for the respective power classes and adjust transmission powers of the spread transmission signals from said first adding circuits for the respective power classes by multiplying the spread transmission signals by predetermined multiplication coefficients;

a second adding circuit which adds/combines the spread transmission signals from said multipliers to output a spread transmission signal obtained by combining the spread transmission signals on the respective transmission channels;

total transmission power measuring means for measuring a total transmission power of each transmission channel on the basis of the spread transmission signal from said second adding circuit;

nonlinear quantization means for nonlinearly quantizing the total transmission power obtained by said total transmission power measuring means and outputting a power level corresponding to the total transmission power;

a power limitation control memory which outputs a multiplication coefficient indicating a power attenuation amount for a power class for which transmission power control is permitted, on the basis of the power level from said nonlinear quantization means; and selectors which are provided for the respective power classes, select, when transmission power control is permitted for the power class, a multiplication coefficient from said power limitation control memory and output the multiplication coefficient to said multiplier corresponding to the power class, and select, when transmission power control is inhibited for the power class, a multiplication coefficient formed from a predetermined fixed value, and output the multiplication coefficient to said multiplier corresponding the power class.

2. A circuit according to claim 1, wherein said power limitation control memory outputs, as the multiplication coefficient, a coefficient corresponding to a ratio of a difference between the power level and a fixed power value corresponding to a power class for which transmission power control is inhibited to a difference between an allowable average power value allowed in said radio base station communication apparatus and the fixed power value.

3. A circuit according to claim 1, wherein said power limitation control memory is provided for each of the power classes and outputs a multiplication coefficient unique to the power class in accordance with an input power level.

4. A circuit according to claim 1, further comprising a multiplier control memory which is provided between said power limitation control memory and each of said selectors, receives a multiplication coefficient from said power limitation control memory, and outputs, to each of said selectors, a multiplication coefficient obtained by performing linear/nonlinear conversion of the multiplication coefficient.

5. A radio base station communication apparatus which transmits data to an arbitrary terminal by a CDMA scheme using a plurality of transmission channels, comprising a transmission signal generating circuit including:

spreading processing circuits which are provided for the respective transmission channels, spread transmission data on the transmission channels, and output the signals as spread transmission signals;

power class selecting circuits which are provided for the respective transmission channels and categorize the spread transmission signals from said spreading processing circuits into a plurality of power classes each serving as a unit of control in transmission power control;

first adding circuits which are provided for the respective power classes and add/combine the spread transmission signals categorized by said power class selecting circuits for the respective power classes;

multipliers which are provided for the respective power classes and adjust transmission powers of the spread transmission signals from said first adding circuits for the respective power classes by multiplying the spread transmission signals by predetermined multiplication coefficients;

a second adding circuit which adds/combines the spread transmission signals from said multipliers to output a spread transmission signal obtained by combining the spread transmission signals on the respective transmission channels;

total transmission power measuring means for measuring a total transmission power of each transmission channel on the basis of the spread transmission signal from said second adding circuit;

nonlinear quantization means for nonlinearly quantizing the total transmission power obtained by said total transmission power measuring means and outputting a power level corresponding to the total transmission power;

a power limitation control memory which outputs a multiplication coefficient indicating a power attenuation amount for a power class for which transmission power control is permitted, on the basis of the power level from said nonlinear quantization means; and selectors which are provided for the respective power classes, select, when transmission power control is permitted for the power class, a multiplication coefficient from said power limitation control memory and output the multiplication coefficient to said multiplier corresponding to the power class, and select, when transmission power control is inhibited for the power class, a multiplication coefficient formed from a predetermined fixed value, and output the multiplication coefficient to said multiplier corresponding the power class.

6. A transmission signal generating circuit used in a radio base station communication apparatus which transmits data to an arbitrary terminal by a CDMA scheme using a plurality of transmission channels, comprising:

spreading processing circuits which are provided for the respective transmission channels, spread transmission data on the transmission channels, and output the signals as spread transmission signals;

time-division multiplexing circuits which are provided for the respective transmission channels, categorize the spread transmission signals from said spreading processing circuits into a plurality of power classes each serving as a unit of control in transmission power control, and time-divisionally multiplex the signals;

a first adding circuit which adds/combines the spread transmission signals time-divisionally multiplexed by said time-division multiplexing circuits;

a time-division demultiplexing circuit which time-divisionally demultiplexes the spread transmission signal from said first adding circuit and outputs spread transmission signals for the respective power classes;

multipliers which are provided for the respective power classes and adjust transmission powers of the spread transmission signals for the respective power classes from said time-division demultiplexing circuit by multiplying the spread transmission signals by predetermined multiplication coefficients;

a second adding circuit which adds/combines the spread transmission signals from said multipliers to output a spread transmission signal obtained by combining the spread transmission signals on the respective transmission channels;

total transmission power measuring means for measuring a total transmission power of each transmission channel on the basis of the spread transmission signal from said first adding circuit;

nonlinear quantization means for nonlinearly quantizing the total transmission power obtained by said total transmission power measuring means and outputting a power level corresponding to the total transmission power;

a power limitation control memory which outputs a multiplication coefficient indicating a power attenuation amount for a power class for which transmission power control is permitted, on the basis of the power level from said nonlinear quantization means; and selectors which are provided for the respective power classes, select, when transmission power control is permitted for the power class, a multiplication coefficient from said power limitation control memory and output the multiplication coefficient to said multiplier corresponding to the power class, and select, when transmission power control is inhibited for the power class, a multiplication coefficient formed from a predetermined fixed value, and output the multiplication coefficient to said multiplier corresponding the power class.

7. A circuit according to claim 6, wherein said power limitation control memory is provided for each of the power classes and outputs a multiplication coefficient unique to the power class in accordance with an input power level.

8. A circuit according to claim 6, further comprising a multiplier control memory which is provided between said power limitation control memory and each of said selectors, receives a multiplication coefficient from said power limitation control memory, and outputs, to each of said selectors, a multiplication coefficient obtained by performing linear/nonlinear conversion of the multiplication coefficient.

9. A circuit according to claim 6, further comprising a delay circuit which is provided between said first adding circuit and said time-division demultiplexing circuit and outputs the spread transmission signal from said first adding circuit to said time-division demultiplexing circuit upon delaying the spread transmission signal.

10. A radio base station communication apparatus which transmits data to an arbitrary terminal by a CDMA scheme using a plurality of transmission channels, comprising a transmission signal generating circuit including:

spreading processing circuits which are provided for the respective transmission channels, spread transmission data on the transmission channels, and output the signals as spread transmission signals;

time-division multiplexing circuits which are provided for the respective transmission channels, categorize the spread transmission signals from said spreading processing circuits into a plurality of power classes each serving as a unit of control in transmission power control, and time-divisionally multiplex the signals;

a first adding circuit which adds/combines the spread transmission signals time-divisionally multiplexed by said time-division multiplexing circuits;

a time-division demultiplexing circuit which time-divisionally demultiplexes the spread transmission signal from said first adding circuit and outputs spread transmission signals for the respective power classes;

multipliers which are provided for the respective power classes and adjust transmission powers of the spread transmission signals for the respective power classes from said time-division demultiplexing circuit by multiplying the spread transmission signals by predetermined multiplication coefficients;

a second adding circuit which adds/combines the spread transmission signals from said multipliers to output a spread transmission signal obtained by combining the spread transmission signals on the respective transmission channels;

total transmission power measuring means for measuring a total transmission power of each transmission channel on the basis of the spread transmission signal from said first adding circuit;

nonlinear quantization means for nonlinearly quantizing the total transmission power obtained by said total transmission power measuring means and outputting a power level corresponding to the total transmission power;

a power limitation control memory which outputs a multiplication coefficient indicating a power attenuation amount for a power class for which transmission power control is permitted, on the basis of the power level from said nonlinear quantization means; and selectors which are provided for the respective power classes, select, when transmission power control is permitted for the power class, a multiplication coefficient from said power limitation control memory and output the multiplication coefficient to said multiplier corresponding to the power class, and select, when transmission power control is inhibited for the power class, a multiplication coefficient formed from a predetermined fixed value, and output the multiplication coefficient to said multiplier corresponding the power class.

* * * * *